July 9, 1974   G. STERN ET AL   3,823,067
SHAPED NUCLEAR FISSIONABLE BODIES
Filed Aug. 2, 1971   2 Sheets-Sheet 1

INVENTORS
George Stern
William F. Roche
BY
*Kenyon, Edmonds, Morton, Taylor & Adams*
ATTORNEYS

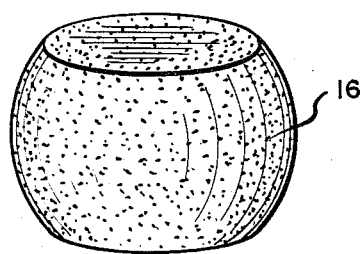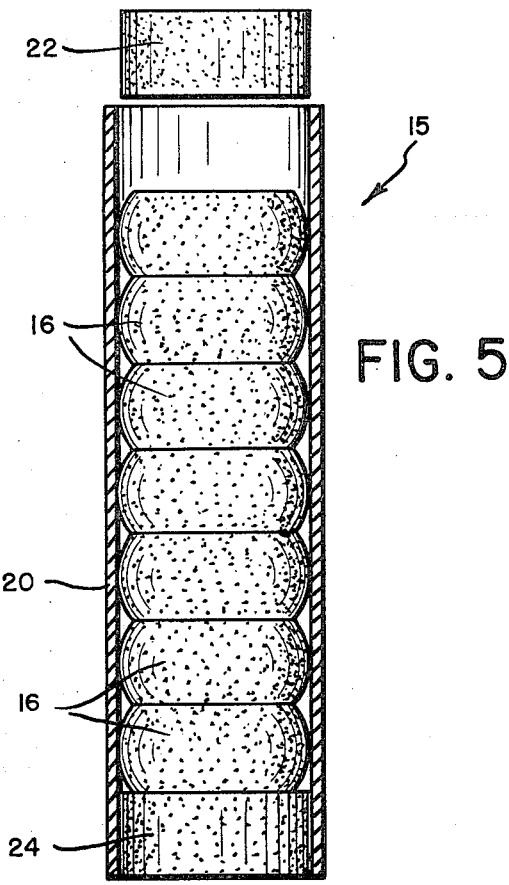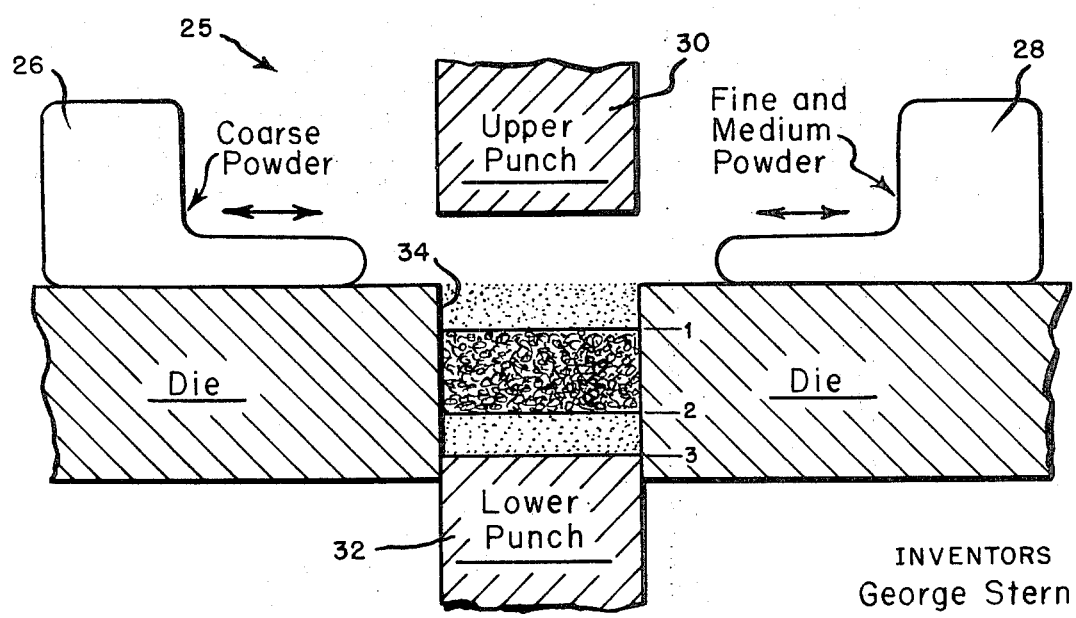

United States Patent Office 3,823,067
Patented July 9, 1974

3,823,067
SHAPED NUCLEAR FISSIONABLE BODIES
George Stern, Mamaroneck, N.Y., and William F. Roche, Stamford, Conn., assignors to United Nuclear Corporation, Elmsford, N.Y.
Filed Aug. 2, 1971, Ser. No. 168,107
Int. Cl. G21c 3/04
U.S. Cl. 176—66      5 Claims

ABSTRACT OF THE DISCLOSURE

Shaped nuclear fuel pellets for use in rod-type fuel elements and particularly shaped fuel pellets formed by sintering fissionable powdered materials.

BACKGROUND OF THE INVENTION

Field of the Invention

This invention relates to improvements in nuclear fuel pellets for use in rod-type nuclear fuel elements and particularly to fuel pellets formed by sintering fissionable powdered materials. The invention also pertains to a unique method for making shaped pellets from loose powdered nuclear fissionable materials and particularly to a method for making such pellets having a substantially barrel-like configuration.

Description of the Prior Art

The manufacture of nuclear fuel pellets from powdered raw materials generally includes compressing the powdered material into the desired shape and then sintering the pellet to permit the powdered materials to bond. Prior to sintering, the compacted powder article is generally referred to as a "green" compact. The finished article is generally referred to as a "ceramic" fuel pellet. In a particular application of this method, ceramic fuel pellets of powdered fissionable materials such as uranium dioxide are produced for rod-type fuel elements which are used in nuclear reactors such as pressurized water reactors, generally referred to as PWR, or boiling water reactors, generally referred to as BWR. The fuel pellets generally have a cylindrical configuration and are closely packed in end-to-end relationship within a cylindrical tubular sheath of cladding of a suitable material. End plugs, caps or other sealing means seal the ends of the sheath thereby forming a leak-proof enclosure for the fuel pellets. The tubular sheath of cladding prevents the loss of fuel and escape of fission products to the reactor coolant and it protects the fuel pellets from corrosion by the coolant. The sheath should have sufficient strength to resist the coolant pressure which tends to collapse the fuel element when the reactor is in operation. Individual fuel elements comprising sheaths and fuel pellets therein are assembled into bundles of fuel element assemblies which are then grouped together with other assemblies to form a reactor core capable of supporting a self-sustaining fission chain reaction.

One disadvantage of rod-type fuel elements utilizing cylindrical fuel pellets is that it is difficult to maintain the integrity of the fuel cladding when the fuel pellets become distorted as a result of the thermal and nuclear effects at sustained power levels. The clearance between the outer cylindrical surfaces of the fuel pellets and the cylindrical inner wall of the cladding is generally held to close tolerances. Under power cycling conditions, cylindrical pellets of the ceramic-type, such as uranium dioxide, exhibit radial growth whereby radial expansion is generally maximum at both ends of each pellet and minimum in the central portion. The pellets assume an "hourglass" configuration causing them to contact the inner walls of the fuel cladding along their expanded edges. During operation of the associated nuclear reactor, the fuel pellets and the fuel cladding expand in an axial direction; however, the different materials have different rates of axial expansion. This results in a relative axial movement between the fuel pellets and the cladding. On repeated cycling, the radial engagement between the pellets and the cladding combined with the differential axial expansion between them causes a mechanism known as "thermal ratcheting." Upon continued cycling, this repeated mechanism causes growth, deformation, and in some instances, rupture of the fuel cladding. This phenomenon can signal the end of the useful life of the fuel element, as both neutron density and coolant flow can no longer be controlled once the cladding has been ruptured.

Various fuel pellet configurations have been proposed to prevent thermal ratcheting and to improve the general operation of such rod-type fuel elements. U.S. Pat. 3,140,983 to Waine proposes solid cylindrical pellets wherein the ends have central depressions. U.S. Pat. 3,075,244 to Glenn shows the formation of a barrel-shaped pellet in the "green compact" form and the compact is formed by means of opposed rams operating in a die cavity. The objective is to make a sintered pellet which is as nearly a right circular cylinder as the method will permit. U.S. Pat. 3,356,584 to Ockert relates to fuel pellets having longitudinal slots along their inner and/or outer lateral surfaces in order to decrease the effect of temperature or irradiation induced growth. U.S. Pat. 3,560,339 to McHugh teaches the use of nuclear reactor fuel elements having an elongated cladding which contains fuel particles and a plurality of discs of smaller diameter than the internal diameter of the cladding. Pat. 2,856,340 to Wigner et al. relates to fuel pellets having a waffle-like surface. None of these patents disclose concepts which are in any manner related to applicants' invention of producing a shaped sintered nuclear fissionable body which eliminates the undesirable thermal ratcheting effect. Other prior art includes U.S. Pats. 3,043,761 to Reynolds, 3,407,116 to Clough and 3,365,371 to Lass et al.

SUMMARY OF THE INVENTION

Broadly stated, the invention relates to a shaped sintered nuclear fissionable body having a predetermined configuration. More particularly, it relates to a sintered nuclear fissionable body such as a ceramic fuel pellet having a barrel-like configuration whereby at least some of such pellets may be disposed within an elongated tubular sheath of fuel cladding to form a nuclear reactor fuel element. The combination of the barrel-like fuel pellets and the tubular fuel cladding is particularly compatible such that upon power cycling of the associated nuclear reactor, each barrel-like pellet expands radially at the end portions causing it to assume a substantially cylindrical configuration. The resultant cylindrical configuration of the pellets conforms to the configuration of the inner wall of the fuel cladding so that when the pellets and the cladding expand axially at different rates, thermal ratcheting is thereby prevented.

The invention also pertains to a unique method for making such shaped nuclear pellets from loose fissionable powdered materials. The method comprises: introducing into a suitable die cavity in a predetermined order quantities of loose powdered materials where each quantity has a particle size which is different from the particle size of the quantity of powdered material immediately previously introduced into the cavity; compressing the materials under pressure to form a green compact; ejecting the compact from the die cavity; and heating the compact to sinter the powdered materials whereby the shrinkage occurring during sintering is so distributed in accordince with the diverse powder particle sizes that the compact assumes a shaped configuration which depends upon the arrangement of the diverse powders in the die cavity. The method readily produces a fuel pellet having the preferred barrel-like shape after sintering. Thus a first quantity of mixed medium and fine particle size powders is introduced into a cylindrical die cavity, a second quantity of coarse particle size powder is introduced into the cavity, and a third quantity of mixed medium and fine particle size powders is introduced into the cavity. The powders are compacted and then sintered. During the sintering process the medium and fine particle size powders at the end portions of the pellet shrink more than a coarse particle powder in the central portion, thereby causing the compact to assume a substantially barrel-like configuration.

It is accordingly an object of the invention to provide a shaped ceramic sintered nuclear fuel pellet for use in rod-type fuel elements, which fuel pellet does not assume an hourglass configuration after repeated power cycling of the nuclear reactor in which it is used.

A feature of our invention is the provision of a sintered nuclear fuel pellet for rod-type fuel elements having a barrel-like configuration such that under repeated thermal and irradiation cycles of an operating nuclear reactor, the pellets assume a substantially cylindrical configuration and thereby do not cause thermal ratcheting within the fuel cladding.

Another feature of our invention is the provision of an improved rod-type fuel element for nuclear reactors, wherein the element utilizes the improved barrel-like ceramic fuel pellets of the invention in combination with a tubular sheath of cladding and is thereby substantially free of the destructive effects of thermal ratcheting.

Still another feature of our invention is the provision of a new and improved method for making a shaped nuclear fuel pellets from loose powdered materials having various particle sizes, where the final configuration depends upon the differential shrinkage of the various particle size powders as a result of sintering.

Still another feature of our invention is the provision of a method for making an improved nuclear fuel pellet having a barrel-like configuration.

Still another feature of our invention is the provision of a method for making an improved nuclear fuel pellet having a substantially cylindrical configuration by subjecting the improved barrel-shaped pellet to nuclear irradiation and thermal cycles.

Other features and advantages of our invention will become apparent from the following description which refers to the drawings.

BRIEF DESCRIPTION OF THE DRAWINGS

FIG. 4 is a perspective view of the sintered pellet of the present invention having a barrel-like configuration;

FIG. 5 is a side elevational cross sectional view of a nuclear reactor rod-type fuel element illustrating the closely-packed barrel-like fuel pellets of the present invention; and FIG. 6 is a side elevational cross sectional view of an apparatus which illustrates a preferred method of making the barrel-like pellets of the invention.

DESCRIPTION OF THE PREFERRED EMBODIMENTS

Figure 1:
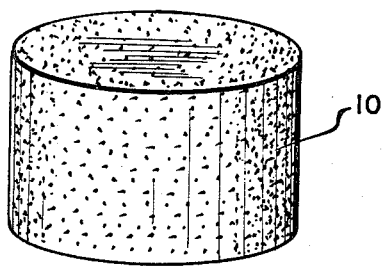
FIG. 1 is a perspective view of a standard right circular cylindrical nuclear fuel pellet of the prior art.

Referring to FIG. 1, there is illustrated a right circular cylindrical nuclear fuel pellet 10 of the prior art.

Figure 2:
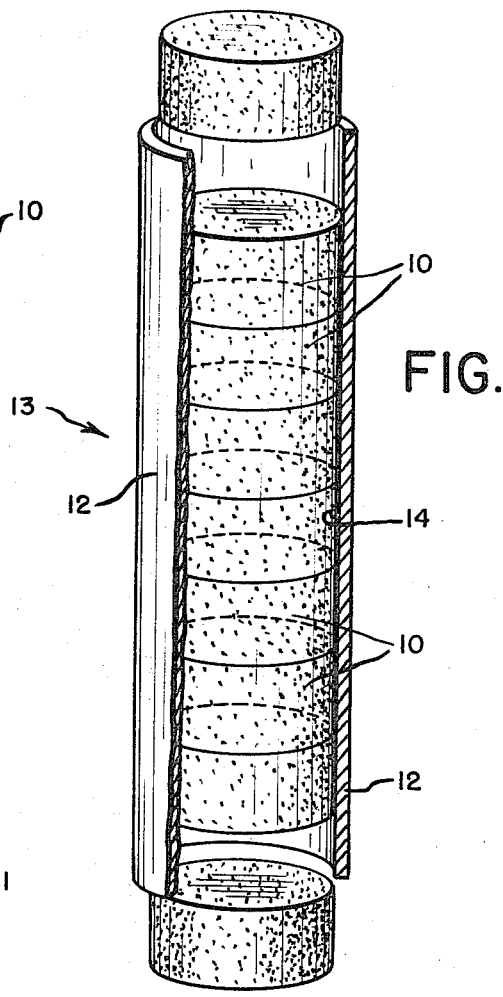
FIG. 2 is a perspective view of a nuclear reactor rod-type fuel element partially broken away, illustrating the closely-packed ceramic fuel pellets therein.
Figure 3:
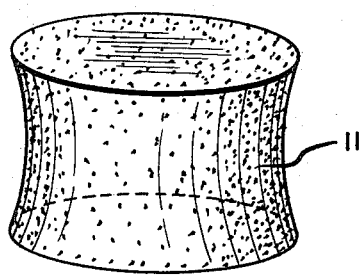
FIG. 3 is a perspective view of the fuel pellet of FIG. 1 after power cycling, illustrating the "hourglassing" resulting from nuclear and thermal effects.

There is shown in FIG. 2, a fuel rod 13 having such pellets 10 generally placed in end-to-end contact within a tubular sheath of cladding 12 having a right circular cylindrical configuration. Normally in such fuel rods the cladding is strong enough to be free standing and a gap is provided between the pellet and the cladding at room temperature. However, at full power the pellet 10 expands and just contacts the cladding inner wall 14 thereby improving thermal conductivity between the pellet and the cladding 12. Eventually, when the pellet surface remains in contact with the inner surface 14 of the cladding 12 during extended periods of operation the cylindrical pellet 10 assumes an hourglass configuration. Hourglassing, which is shown in FIG. 3, is the condition whereby the diameter of the cross-section of each pellet at or near each end is greater than the diameter of the cross-section midway between the ends. It may be caused by axial forces applied between the pellets as they undergo axial expansion during operation of the associated nuclear reactor. Hourglassing generally results in substantial engagement between the radially expanded end portions of the pellet and the inner walls of the fuel cladding. Such engagement tends to prevent the pellets from shifting in an axial direction relative to the fuel cladding.

During the repeated cycling of the reactor, the hourglassed pellets 11 of FIG. 3 tend to expand axially at a different rate of expansion than the fuel cladding 12 due to the different rates of expansion of the materials from which these components are constructed. This results in a relative axial movement between the hourglassed pellets 11 and the cladding 12. The engagement between the expanded edges of the hourglassed pellets 11 and the cladding inner walls 14, combined with the axial shifting of the pellets, causes a phenomenon which is generally referred to as "thermal ratcheting" whereby the pellets 11 actually scrape the inner walls of the cladding.

Upon repeated cycling of the reactor between zero power and operative power levels, ratcheting causes distortion of the fuel cladding and, in some instances, rupture of the cladding. To offset these undesirable effects, we provide a fuel pellet having a preferred barrel-like configuration as is shown at 16 in FIG. 4. Such pellets which are preferably made of, but not limited to, sintered uranium dioxide powders may be closely packed in end-to-end relationship within a tubular sheath such as the cladding 20 as shown in FIG. 5. The cladding 20 may be made of any suitable material such as the zirconium alloy which is generally known as Zircaloy. This may include, but is not limited to, Zircaloy-2 and Zircaloy-4. Other exemplary cladding materials include stainless steel and the nickel based alloys such as Incaloy and Inconel. These pellets will respond to repeated power cycling by assuming a substantially cylindrical configuration instead of an hourglass shape when the radial expansion at the end portions exceeds the radial expansion in the central portion thereof. The initial barrel-like shape actually offsets the "hourglassing effect," causing the pellet to assume a substantially right circular cylindrical form after repeated power cycling. This avoids the substantial engagement between the expanded ridges of the pellet and the inner walls of the fuel cladding, which was common to the cylindrical pellets 10 of the prior art shown in FIG. 1. Thus it is clear that a unique method of making pellets having a substantially cylindrical form such as is shown in FIG. 1 will include subjecting the barrel-like pellets to irradiation by utilizing them with a nuclear reactor for sufficient power cycles to cause them to assume a right circular cylindrical configuration. Since they actually have expanded end portions, they will not assume an "hourglass" shape as is common with pellets which are initially cylindrical.

The barrel-like pellets 16 of FIG. 4 are also shown in FIG. 5 as part of a rod-type fuel element 15 comprised of a tubular sheath of cladding 20 and end closure means such as, but not limited to, end plugs 22 and 24. Other components which may be used with the end plugs to form a leak-proof system, such as springs and the like, are not shown because they are well-known in the art.

However, it should be understood that the description and the claims are intended to include end closure components which are generally used in the art.

The barrel-like pellets of the present invention may be made by grinding cylindrical pellets to the preferred configuration. However, they are preferably fabricated of mixtures of fissionable powdered metal oxides such as uranium dioxide wherein the powders have different particle sizes which undergo differential shrinkage during the sintering process and thereby determine the final shape of the sintered pellet. Such powders are generally prepared by mixing them with a temporary organic binder such as metal soap, a resin, a long carbon chain alcohol or glycol and derivatives of such alcohols and glycols such as the acetates and formaldehydes thereof. A stearate lubricant such as calcium stearate for example, in the range of .2 to .4% by weight, is generally added.

Referring to FIG. 6, there are shown components of a powder metal press 25 modified to have two fill shoes 26 and 28, each containing a powdered material, such as a fissionable metal oxide suitable for making ceramic fuel pellets, an upper punch 30 and a lower punch 32 which can assume three different fill positions shown in FIG. 5 as positions 1, 2 and 3. The powder in shoe 26 is a relatively coarse uranium dioxide powder for example, having particle sizes substantially within the range of 10 to 44 microns, but preferably within the range of 10 to 20 microns. The powder in shoe 28 is preferably a mixture of relatively fine and medium uranium dioxide powders. The fine powder has a preferred particle size up to about 1.4 microns and the medium powder has a preferred particle size substantially within the range of 1.4 to 10 microns. All of the powders are preferably mixed with a suitable lubricant and temporary binder.

The lower punch 32 is held within the die cavity 34 at fill position No. 1 while it is filled with the mixture of fine and medium powders from shoe 28. The lower punch 32 is then held at fill position No. 2 while the die cavity 34 is filled with the coarse powder from shoe 26. The lower punch 32 is then withdrawn to fill position No. 3 while the die cavity 34 is filled to the top level with the mixture of fine and medium powders from shoe 28. Shoe 28 is removed to its neutral position and the upper punch 30 enters the die cavity while the lower punch simultaneously moves up to press the powders from two directions. After full compaction to the desired density, the upper punch is withdrawn and the lower punch moves up to the eject position. The pellet is removed and the cycle of fill, press, and eject is repeated.

The pellets are then sintered, preferably in a hydrogen atmosphere at a temperature which is substantially within the range of 1200° C. to 1725° C. for a period of from 1 to 10 hours, for example. Since, as a result of sintering, the fine and medium powders at the end portions will shrink more than the relatively coarse powder in the central portion, a pellet having a substantially barrel-like configuration will result as shown in FIGS. 4 and 5. By properly selecting the powders for the shoes and by selecting the fill positions of the lower punch, a wide range of shapes can be achieved with varying configurations and contours. In addition, careful selection of the powder sizes can avoid fractures or laminations in the final sintered pellets.

While a preferred form of the invention has been described, it should be understood that various modifications and adaptations thereof may be made by those skilled in this particular art without departing from the spirit and scope of the invention as set forth in the following claims.

We claim:
1. A sintered nuclear fissionable metal oxide body of compacted fissionable particles which prior to sintering of the compacted body, is substantially cylindrical and after sintering assumes a substantially barrel-like configuration having a maximum diameter section in a substantially central portion thereof and a lesser diameter section at each end portion thereof and the larger diameter section comprising larger size particles than the particles comprising the end portions whereby when at least one of said sintered bodies forms at least a portion of nuclear reactor core, during the power operation of said reactor, the lesser diameter end portions of said body will expand in a substantially radial direction such that the sintered body asumes a substantially cylindrical configuration.

2. A nuclear fissionable metal oxide body according to claim 1 wherein at least one fissionable metal oxide is uranium dioxide.

3. A nuclear fissionable metal oxide body according to claim 2 wherein the size of the particles in the substantially central portion thereof is substantially between 10 and 44 microns and the size of the particles in the end portions is substantially between 0 and 10 microns.

4. A nuclear fissionable metal oxide body according to claim 3 wherein prior to sintering the end portions of said body are comprised of a mixture of medium and fine metal oxide powders, said fine powders having particle sizes substantially between 0 and 1.4 microns and said medium powders having particle sizes substantially between 1.4 and 10 microns.

5. A nuclear fissionable metal oxide body according to claim 4 wherein prior to sintering the substantially central portion thereof is comprised of metal oxide powders having particle sizes substantially between 10 and 20 microns.

References Cited
UNITED STATES PATENTS

| | | | |
|---|---|---|---|
| 3,075,244 | 1/1963 | Glenn | 176—90 X |
| 3,009,869 | 11/1963 | Bassett | 176—90 |
| 3,129,140 | 4/1964 | Stohr et al. | 176—90 X |
| 3,043,761 | 7/1962 | Reynolds | 176—90 X |
| 3,356,584 | 12/1967 | Ockert | 176—90 X |
| 3,034,975 | 5/1962 | Beurtheret | 176—90 X |
| 3,227,622 | 1/1966 | White | 176—90 X |
| 2,992,179 | 7/1961 | Bassett | 176—90 |
| 3,133,000 | 5/1964 | Beavis | 176—90 X |
| 3,244,599 | 4/1966 | Hildebrand | 176—90 X |
| 3,184,392 | 5/1965 | Blake | 176—67 |

FOREIGN PATENTS

| | | | |
|---|---|---|---|
| 893,970 | 4/1962 | Great Britain | 176—91 R |
| 1,084,999 | 9/1967 | Great Britain | 176—31 |

CARL D. QUARFORTH, Primary Examiner

R. GAITHER, Assistant Examiner

U.S. Cl. X.R.

176—67, 90, 91 R; 264—0.5